J. Knodle,
Cultivator,
Nº 1543.  Patented Apr. 8, 1840.
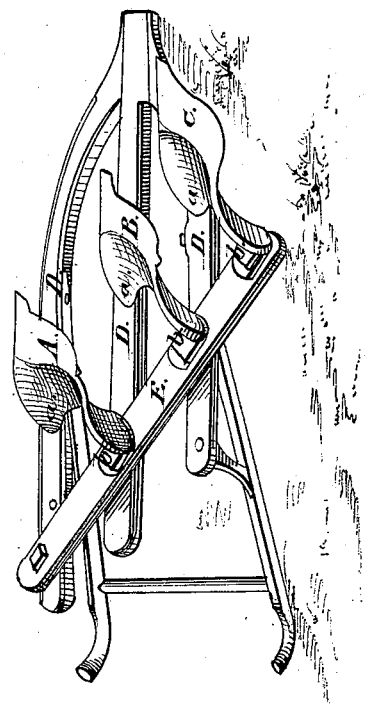

UNITED STATES PATENT OFFICE.

JONATHAN KNODLE, OF BAKERSVILLE, MARYLAND.

IMPROVEMENT IN THE MODES OF CONSTRUCTING COMBINED PLOWS.

Specification forming part of Letters Patent No. 1,543, dated April 8, 1840.

*To all whom it may concern:*

Be it known that I, JONATHAN KNODLE, of Bakersville, in the county of Washington and State of Maryland, have invented an Improvement in the Manner of Constructing Combined Plows for Plowing Light Soils, which improved plow I denominate the "Combined Mold-Board Plow;" and I do hereby declare that the following is a full and exact description thereof.

I construct my plow with three or any other convenient number of mold-boards, in general preferring three, as represented in the accompanying drawing. I do not intend to confine or limit myself to any particular construction of mold-boards; but use these in any of the approved forms which I may prefer.

The distinguishing feature of my invention is the entire dispensing in my combined mold-board plow with the landside, by which means I am enabled so to arrange the mold-boards as that they shall overlap upon each other, and so that in passing along the ground and making their respective furrows the point of each of the hindermost plows shall follow that which precedes it in a line within the width of the furrow-shoe made by it. By this arrangement the forward mold-boards will allow of the turning of the earth or sward into the hollow or space left on its inner side by the omission of the landside, and the earth will also be more completely broken and mixed than by an other combined plow.

The accompanying drawing represents the under side of my combined mold-board plow, and shows the manner in which the mold-boards are arranged, and likewise a convenient and simple mode of constructing the wood-work and attaching the mold-boards thereto.

A B C are three cast-iron mold-boards without landsides, and the fore parts of these are attached by screw-bolts or otherwise at $a\ a$ to the longitudinal timbers D D D, while their rear ends are similarly fastened, as at $b\ b$, to the oblique timber E, making a part of the wooding or frame of my plow.

I am aware that two or more plows have been combined together in the same frame, and I do not therefore make any claim to such a combination as heretofore made; but What I do claim is—

The using of several mold-boards, of cast-iron, of the ordinary construction of such mold-boards, but without landsides, and so arranging said mold-boards as that the point of either of those in the rear shall follow that which precedes it within the width of its furrow-shoe, in the manner and for the purpose herein set forth.

JONATHAN KNODLE.

Witnesses:
   THOS. P. JONES,
   WM. T. UPPERMAN.